(12) United States Patent
Hinman et al.

(10) Patent No.: US 8,947,528 B2
(45) Date of Patent: *Feb. 3, 2015

(54) CONTAINER-CLASSIFICATION IDENTIFICATION USING DIRECTIONAL-ANTENNA RFID

(75) Inventors: Mark P. Hinman, Holly, NY (US); Donald Saul Rimai, Webster, NY (US); Abhishek Sharma, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 449 days.

This patent is subject to a terminal disclaimer.

(21) Appl. No.: 13/477,379

(22) Filed: May 22, 2012

(65) Prior Publication Data

US 2013/0314534 A1    Nov. 28, 2013

(51) Int. Cl.
*H04N 7/18* (2006.01)
*G01S 5/04* (2006.01)
*H04Q 5/22* (2006.01)
*G08B 13/14* (2006.01)

(52) U.S. Cl.
USPC ....... 348/143; 340/10.1; 340/10.4; 340/572.1

(58) Field of Classification Search
None
See application file for complete search history.

(56) References Cited

U.S. PATENT DOCUMENTS

| | | | |
|---|---|---|---|
| 6,169,910 B1 | 1/2001 | Tamil et al. | |
| 6,725,014 B1 | 4/2004 | Voegele | |
| 7,086,587 B2 | 8/2006 | Myllymaki | |
| 7,852,219 B2 | 12/2010 | Childress et al. | |
| 7,969,286 B2 | 6/2011 | Adelbert | |
| 8,212,677 B2 * | 7/2012 | Ferguson | 340/572.3 |
| 8,330,601 B2 * | 12/2012 | Ashwood Smith et al. | 340/572.1 |
| 2006/0059367 A1 * | 3/2006 | Yarvis | 713/189 |
| 2008/0129493 A1 * | 6/2008 | Fuentes et al. | 340/539.22 |
| 2009/0021343 A1 | 1/2009 | Sinha | |
| 2009/0174556 A1 | 7/2009 | Horne et al. | |
| 2009/0322510 A1 * | 12/2009 | Berger et al. | 340/539.1 |
| 2011/0018707 A1 * | 1/2011 | Dobson et al. | 340/539.13 |

\* cited by examiner

*Primary Examiner* — Geepy Pe
*Assistant Examiner* — Janese Duley
(74) *Attorney, Agent, or Firm* — Christopher J. White

(57) ABSTRACT

A classification of a container is identified using a mobile station including an image capture device and an RFID reader having a reader antenna. The container has two RFID tags affixed thereto at respective, different locations. Each tag has a directional antenna steered in a different direction, so that a reader location is defined in the intersection of the antenna propagation patterns. Using the image capture device, one or more images of the container are captured. A controller determines, using the captured image data, whether the mobile station is in a candidate reader location. When the mobile station is in the candidate reader location, the RFID reader attempts to read both tags. If both tags are read while the mobile station is in the candidate reader location, the controller determines the classification of the container is a classification corresponding to the candidate reader location.

17 Claims, 8 Drawing Sheets

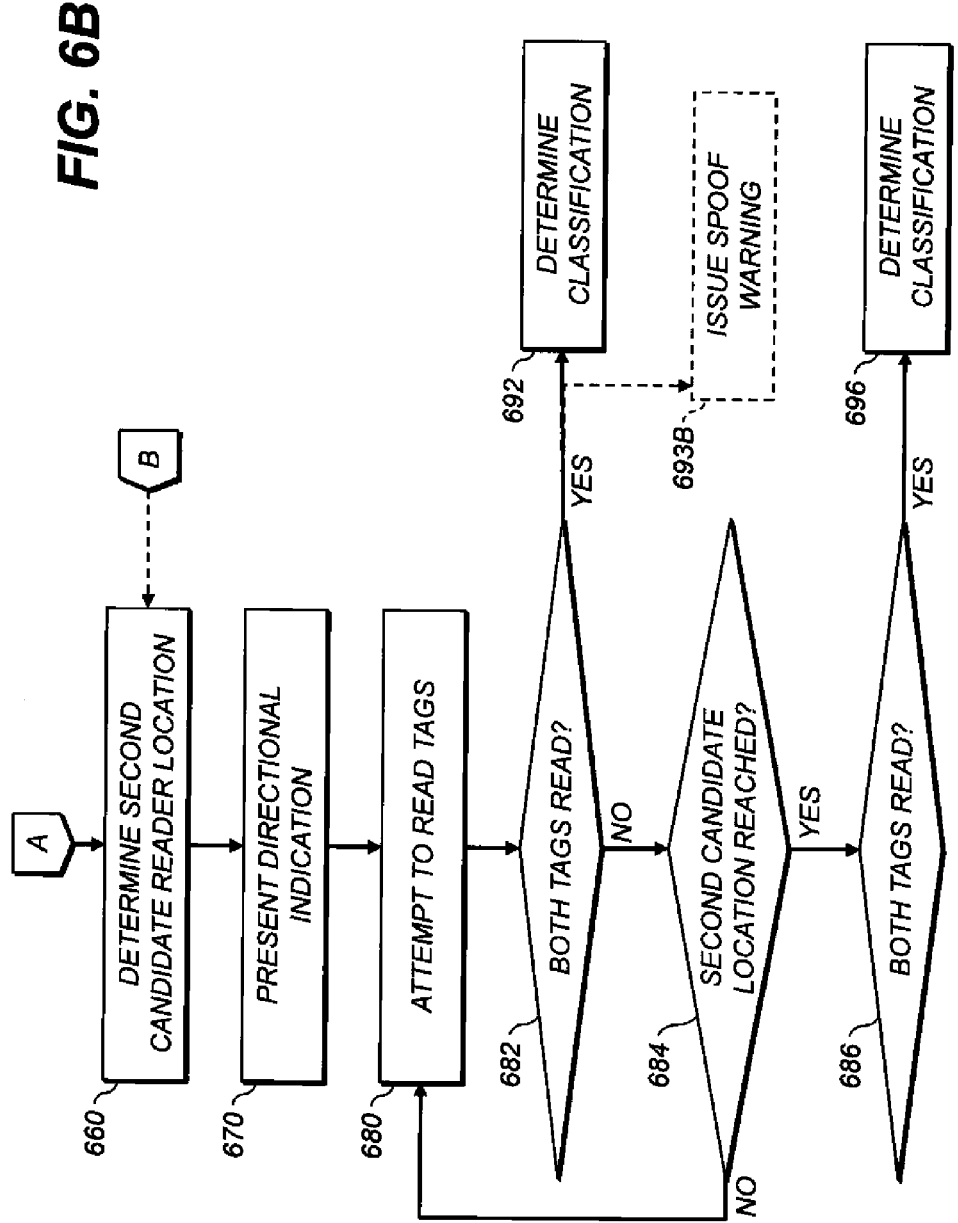

CONTAINER-CLASSIFICATION IDENTIFICATION USING DIRECTIONAL-ANTENNA RFID

CROSS-REFERENCE TO RELATED APPLICATIONS

This application has related subject matter to U.S. patent application Ser. No. 13/477,195 filed herewith, titled "CONTAINER-TYPE IDENTIFICATION USING DIRECTIONAL-ANTENNA RFID," and U.S. patent application Ser. No. 13/477,422, filed herewith, titled "RFID MARKING OF UNITS IN A SPACE" the disclosures of which are hereby incorporated herein by reference.

FIELD OF THE INVENTION

This invention pertains to the field of radio-frequency communication between radio-frequency identification (RFID) tags and RFID readers, and to external identification of containers.

BACKGROUND OF THE INVENTION

Containers of various sizes bear identifying marks describing their structure or contents. Cardboard boxes are labeled with test data such as edge-crush strength. Retail packaging carries advertising and marketing messages for potential buyers. Intermodal containers (shipping containers) carry ISO 6346 serial numbers and size codes. Indicia and markings on containers are used to determine how to handle a container and to dispatch it to a desired location. These indicia are generally printed visually. However, visual indicia can wear off over time or be covered over with graffiti. There is therefore a need for a way of marking containers that retains the ease-of-use of visual indicia but does not exhibit some of the same limitations.

RFID tags are sometimes used to identify containers of products, e.g., products used in various commercial or industrial processes. RFID tags respond to an external RF signal transmitted wirelessly from an RFID reader with a stored identification code or other data. The term "reader" is customary and does not imply that the reader only listens; indeed, RFID readers generally communicate bidirectionally. RFID readers and tags can communicate using, e.g., the EPC Class-1 Generation-2 UHF RFID Protocol for Communications at 860 MHz-960 MHz, Version 1.2.0, Oct. 23, 2008, incorporated herein by reference. A container with a tag affixed thereto is referred to herein as a "tagged container." Tags on containers can carry information about the type of products in those containers and the source of those products.

However, RFID tags generally respond to any RFID reader within range. Containers, especially shipping containers, are often densely packed in a given location. For example, container ship MV Emma Mcersk can hold approximately 11,000 twenty-foot long intermodal containers (11,000 TEU). There is, therefore, a need for a way of selecting which RFID tag a reader should communicate with. There is also a need for a way of confirming that the RFID tag being communicated with corresponds to a particular container.

Various schemes use directional antennas for these purposes. However, directional antennas are not effective with configurations in which multiple RF-transparent tagged containers are arranged along a line extending from the reader, e.g., cardboard boxes loaded on a pallet. In these configurations, it is difficult to determine which container along the line is being read. Moreover, without a way of confirming that a tag being read corresponds to a particular container, an intruder can respond to a reader pretending to be the tag for a particular container. This is referred to as "spoofing." If measures are not taken against spoofing, a spoofer can falsify identification data for a container, possibly exposing shipping companies to liability for mis-shipped goods. This problem is particularly noticeable in relatively less-controlled environments such as freight yards, as compared with factories or other tightly-controlled environments. A spoofer can stand outside the fence of a shipyard and, with a sufficiently powerful RFID reader, spoof RFID tags at a considerable distance.

There is, therefore, a continuing need for a way of reliably determining information about a container, and specifically of reliably communicating with a particular selected tagged container.

SUMMARY OF THE INVENTION

According to an aspect of the present invention, there is provided a method of identifying a classification of a container using a mobile station including a controller, an image capture device, and an RFID reader having a reader antenna, the method comprising:

using the image capture device, capturing one or more image(s) of the container to provide captured image data, wherein the container has two RFID tags affixed thereto at respective, different tag locations, each tag including a respective directional antenna steered in a respective, different direction, so that respective directional propagation patterns are defined and a reader location is defined in an intersection of the propagation patterns;

the controller automatically determining, using the captured image data, whether the mobile station is in a candidate reader location; and when the mobile station is in the candidate reader location, the controller activating the RFID reader to attempt to read both tags, so that if both tags are read while the mobile station is in the candidate reader location, the controller determines the classification of the container is a classification corresponding to the candidate reader location.

An advantage of this invention is that it confirms the classification of a particular container with which the mobile station is in a particular geometric relationship. This ties the RFID data to the particular container in question. Various embodiments provide clear visual feedback to a user of the mobile station to assist the user in communicating with the container that the user is interested in. By using directional tag antennas with a selected reader antenna, which can be omnidirectional, various embodiments do not require any custom RFID reader hardware, RFID tag integrated circuitry (only custom tag antennas), or unusual capabilities in the mobile station. Various embodiments guard against spoofing by measuring RF signals at various points to determine a spatial distribution of the signal. Various embodiments advantageously provide an identified reader location at which data from the tags can be read. A skimmer, an RFID reader or RF scanner attempting to read the tag data, cannot successfully skim all of the data for the package without displacing a legitimate reader at the reader location.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein:

FIGS. 6, 6A, and 6B show various embodiments of methods of identifying a classification of a container using a mobile station;

Figure 1:
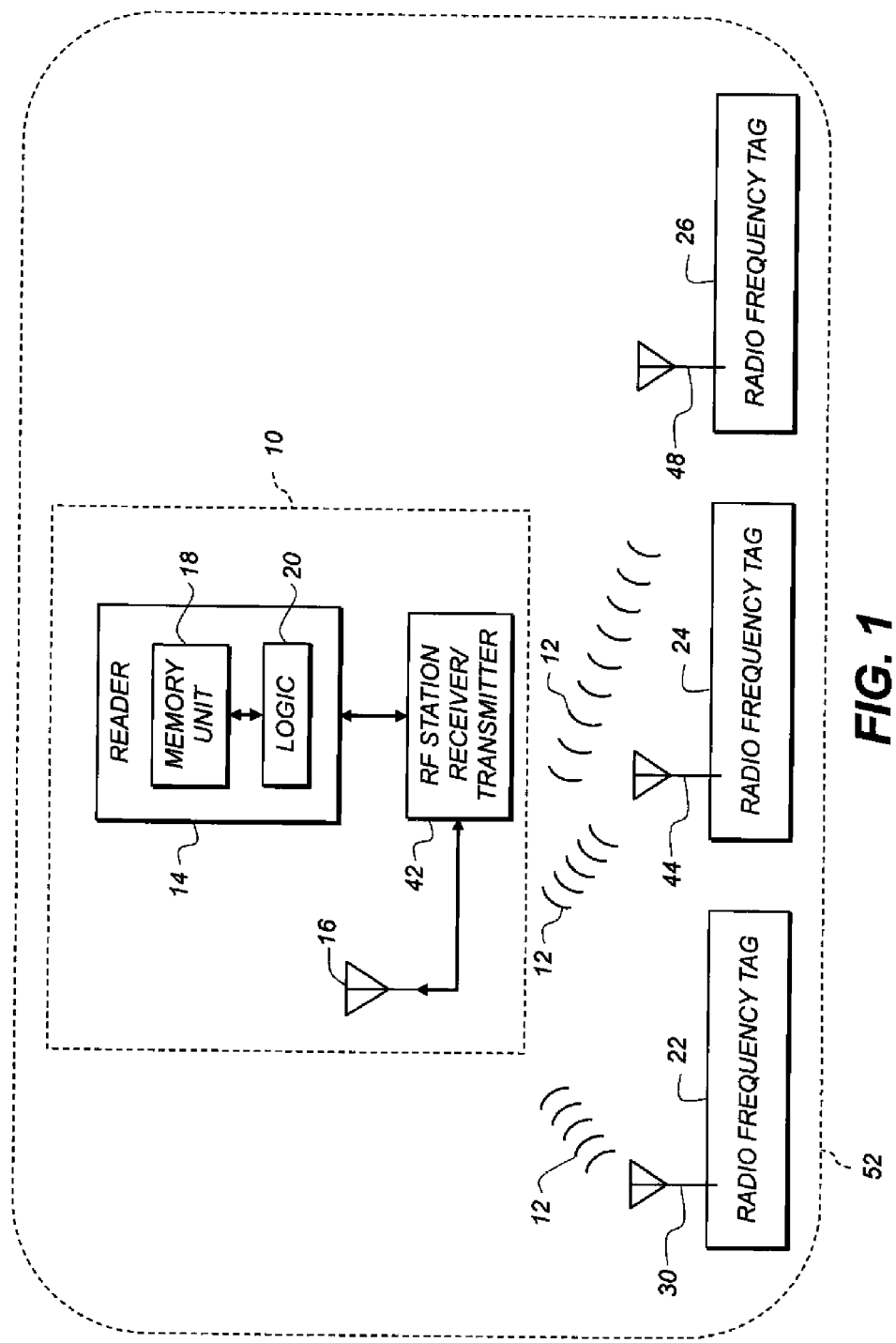
FIG. 1 is a block diagram of an RFID system according to various embodiments.

The attached drawings are for purposes of illustration and are not necessarily to scale.

DETAILED DESCRIPTION OF THE INVENTION

In this disclosure, the term "classification" refers to any information specific to a container. A container's classification can include a unique ID number of the container or its contents; information about container ownership (owner, lessee); or an indication of what kind of container it is, what size it is (dimensions or volume), or what its mechanical properties are (e.g., its strength or maximum gross weight). Other items for which a container has particular values (e.g., paint color) can also be included in the container's classification.

In the following description, some embodiments will be described in terms that would ordinarily be implemented as software programs. Those skilled in the art will readily recognize that the equivalent of such software can also be constructed in hardware. Because image manipulation algorithms and systems are well known, the present description will be directed in particular to algorithms and systems forming part of, or cooperating more directly with, methods described herein. Other aspects of such algorithms and systems, and hardware or software for producing and otherwise processing the image signals involved therewith, not specifically shown or described herein, are selected from such systems, algorithms, components, and elements known in the art. Given the system as described herein, software not specifically shown, suggested, or described herein that is useful for implementation of various embodiments is conventional and within the ordinary skill in such arts.

A computer program product can include one or more storage media, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice methods according to various embodiments.

Various electronic equipment or devices can communicate using wireless links. A popular technology for communication with low-power portable devices is radio frequency identification (RFID). Standardized RFID technology provides communication between an interrogator (or "reader") and a "tag" (or "transponder"), a portable device that transmits an information code or other information to the reader. Tags are generally much lower-cost than readers. RFID standards exist for different frequency bands, e.g., 125 kHz (LF, inductive or magnetic-field coupling in the near field), 13.56 MHz (HF, inductive coupling), 433 MHz, 860-960 MHz (UHF, e.g., 915 MHz, RF coupling beyond the near field), or 2.4 GHz, or 5.8 GHz. Tags can use inductive, capacitive, or RF coupling (e.g., backscatter, discussed below) to communicate with readers. Although the term "reader" is commonly used to describe interrogators, "readers" (i.e., interrogators) can also write data to tags and issue commands to tags. For example, a reader can issue a "kill command" to cause a tag to render itself permanently inoperative.

Radio frequency identification systems are typically categorized as either "active" or "passive." In an active RFID system, tags are powered by an internal battery, and data written into active tags can be rewritten and modified. In a passive RFID system, tags operate without an internal power source, instead being powered by received RF energy from the reader. "Semi-active" or "semi-passive" tags use batteries for internal power, but use power from the reader to transmit data. Passive tags are typically programmed with a unique set of data that cannot be modified. A typical passive RFID system includes a reader and a plurality of passive tags. The tags respond with stored information to coded RF signals that are typically sent from the reader. Further details of RFID systems are given in commonly-assigned U.S. Pat. No. 7,969,286 to Adelbert, and in U.S. Pat. No. 6,725,014 to Voegele, both of which are incorporated herein by reference.

RFID tags in general, and specifically passive tags, often do not have enough processing power or memory to perform cryptographic authentication or authorization functions, such as secure hashing with time-varying salt. Consequently, every read of a tag returns the same data. As a result, RFID systems can be vulnerable to attacks in which a rogue (non-authorized) reader placed near a tag reads and stores that tag's data. This process is called "skimming," and such rogue readers are referred to as "skimmers." The skimmer can later replay the stored data (a "replay attack") to pretend to be the skimmed tag ("spoofing"). This can result in incorrect products being used in industrial or commercial processes, or mishandled inventory in a retail environment, possibly resulting in lost productivity or wasted product. Skimmers can actively interrogate RFID tags, or passively wait and record data sent by tags being interrogated by authorized readers. In other cases, skimmers can passively record the data transfers by which an authorized reader opens a communications session with an RFID tag. The skimmer can then use this information to open a communications session with the RFID tag and make unauthorized changes to data stored on the tag.

Various schemes have been proposed to reduce vulnerability of RFID systems to skimmers. U.S. Patent Publication No. 2009/0174556 by Horne et al. describes an RFID blocker that disrupts an RFID reader's signal to a tag when the blocker is physically near the tag. However, the blocker will disrupt all accesses, not just unauthorized access. In another scheme, U.S. Patent Publication No. 2009/0021343 by Sinha describes jamming or spoofing skimmers, either using authorized electronics or intrusion-prevention tags, in response to intrusions or policy violations. U.S. Pat. No. 7,086,587 to Myllymaki describes RFID readers that can detect unauthorized tags, and tags that can detect unauthorized readers. However, none of these schemes reduces the probability of passive monitoring by a skimmer during an authorized read of the tag. Various prior-art schemes use readers with directional antennas to reduce the area of operation in which a skimmer can detect that a read is in progress.

In various embodiments, as described in the GS1 EPC Tag Data Standard ver. 1.6, ratified Sep. 9, 2011, incorporated herein by reference, an RFID tag carries a "Serialized Global Trade Item Number" (SGTIN). Each SGTIN uniquely identifies a particular instance of a trade item, such as a specific manufactured item. For example, a manufacturer of cast-iron skillets can have, as a "product" (in GS1 terms) a 10" skillet. Each 10" skillet manufactured has the same UPC code, called a "Global Trade Item Number" (GTIN). Each 10" skillet the manufacturer produces is an "instance" of the product, in GS1 terms, and has a unique Serialized GTIN (SGTIN). The SGTIN identifies the company that makes the product and the product itself (together, the GTIN), and the serial number of the instance. Each box in which a 10" skillet is packed can have affixed thereto an RFID tag bearing the SGTIN of the particular skillet packed in that box. SGTINs and related identifiers, carried on RFID tags, can permit verifying that the correct products are used at various points in a process.

FIG. 1 is a block diagram of an RFID system according to various embodiments. Base station 10 communicates with three RF tags 22, 24, 26, which can be active or passive in any combination, via a wireless network across an air interface 12. FIG. 1 shows three tags, but any number can be used. Base station 10 includes reader 14, reader's antenna 16 and RF station 42. RF station 42 includes an RF transmitter and an RF receiver (not shown) to transmit and receive RF signals via reader's antenna 16 to or from RF tags 22, 24, 26. Tags 22, 24, 26 transmit and receive via respective antennas 30, 44, 48.

Reader 14 includes memory unit 18 and logic unit 20. Memory unit 18 can store application data and identification information (e.g., tag identification numbers) or SG TINS of RF tags in range 52 (RF signal range) of reader 14. Logic unit 20 can be a microprocessor, FPGA, PAL, PLA, or PLD. Logic unit 20 can control which commands that are sent from reader 14 to the tags in range 52, control sending and receiving of RF signals via RF station 42 and reader's antenna 16, or determine if a contention has occurred.

Reader 14 can continuously or selectively produce an RF signal when active. The RF signal power transmitted and the geometry of reader's antenna 16 define the shape, size, and orientation of range 52. Reader 14 can use more than one antenna to extend or shape range 52.

Figure 2:
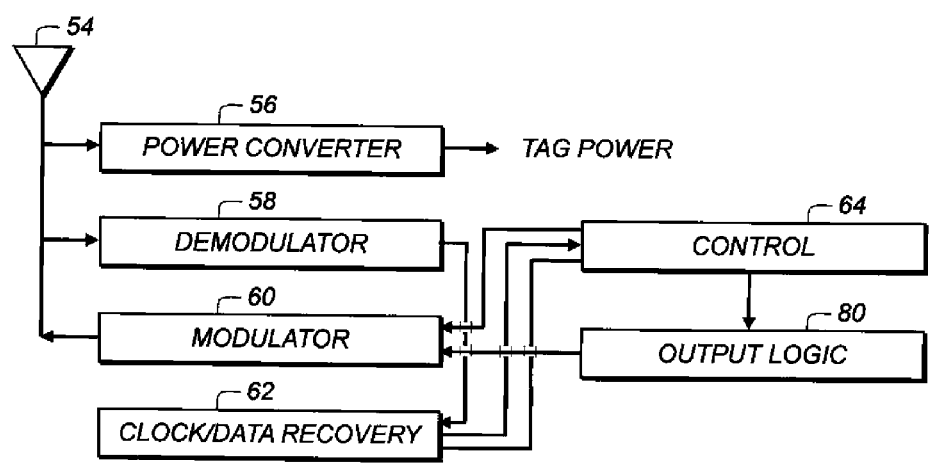
FIG. 2 is a block diagram of a passive RFID tag according to various embodiments.

FIG. 2 is a block diagram of a passive RFID tag (e.g., tags 22, 24, 26 according to an embodiment of the system shown in FIG. 1) according to various embodiments. The tag can be a low-power integrated circuit, and can employ a "coil-on-chip" antenna for receiving power and data. The RFID tag includes antenna 54 (or multiple antennas), power converter 56, demodulator 58, modulator 60, clock/data recovery circuit 62, control unit 64, and output logic 80. Antenna 54 can be an omnidirectional antenna impedance-matched to the transmission frequency of reader 14 (FIG. 1). The RFID tag can include a support, for example, a piece of polyimide (e.g., KAPTON) with pressure-sensitive adhesive thereon for affixing to packages. The tag can also include a memory (often RAM in active tags or ROM in passive tags) to record digital data, e.g., an SGTIN.

Reader 14 (FIG. 1) charges the tag by transmitting a charging signal, e.g., a 915 MHz sine wave. When the tag receives the charging signal, power converter 56 stores at least some of the energy being received by antenna 54 in a capacitor, or otherwise stores energy to power the tag during operation.

After charging, reader 14 transmits an instruction signal by modulating onto the carrier signal data for the instruction signal, e.g., to command the tag to reply with a stored SGTIN. Demodulator 58 receives the modulated carrier bearing those instruction signals. Control unit 64 receives instructions from demodulator 58 via clock/data recovery circuit 62, which can derive a clock signal from the received carrier. Control unit 64 determines data to be transmitted to reader 14 and provides it to output logic 80. For example, control unit 64 can retrieve information from a laser-programmable or fusible-link register on the tag. Output logic 80 shifts out the data to be transmitted via modulator 60 to antenna 54. The tag can also include a cryptographic module (not shown). The cryptographic module can calculate secure hashes (e.g., SHA-1) of data or encrypt or decrypt data using public- or private-key encryption. The cryptographic module can also perform the tag side of a Diffie-Hellman or other key exchange.

Signals with various functions can be transmitted; some examples are given in this paragraph. Read signals cause the tag to respond with stored data, e.g., an SGTIN. Command signals cause the tag to perform a specified function (e.g., kill). Authorization signals carry information used to establish that the reader and tag are permitted to communicate with each other.

Passive tags typically transmit data by backscatter modulation to send data to the reader. This is similar to a radar system. Reader 14 continuously produces the RF carrier sine wave. When a tag enters the reader's RF range 52 (FIG. 1; also referred to as a "field of view") and receives, through its antenna from the carrier signal, sufficient energy to operate, output logic 80 receives data, as discussed above, which is to be backscattered.

Modulator 60 then changes the load impedance seen by the tag's antenna in a time sequence corresponding to the data from output logic 80. Impedance mismatches between the tag antenna and its load (the tag circuitry) cause reflections, which result in momentary fluctuations in the amplitude or phase of the carrier wave bouncing back to reader 14. Reader 14 senses for occurrences and timing of these fluctuations and decodes them to receive the data clocked out by the tag. In various embodiments, modulator 60 includes an output transistor (not shown) that short-circuits the antenna in the time sequence (e.g., short-circuited for a 1 bit, not short-circuited for a 0 bit), or opens or closes the circuit from the antenna to the on-tag load in the time sequence. In another embodiment, modulator 60 connects and disconnects a load capacitor across the antenna in the time sequence. Further details of passive tags and backscatter modulation are provided in U.S. Pat. No. 7,965,189 to Shanks et al. and in "Remotely Powered Addressable UHF RFID Integrated System" by Curty et al., IEEE Journal of Solid-State Circuits, vol. 40, no. 11, November 2005, both of which are incorporated herein by reference. As used herein, both backscatter modulation and active transmissions are considered to be transmissions from the RFID tag. In active transmissions, the RFID tag produces and modulates a transmission carrier signal at the same wavelength or at a different wavelength from the read signals from the reader.

Figure 3:
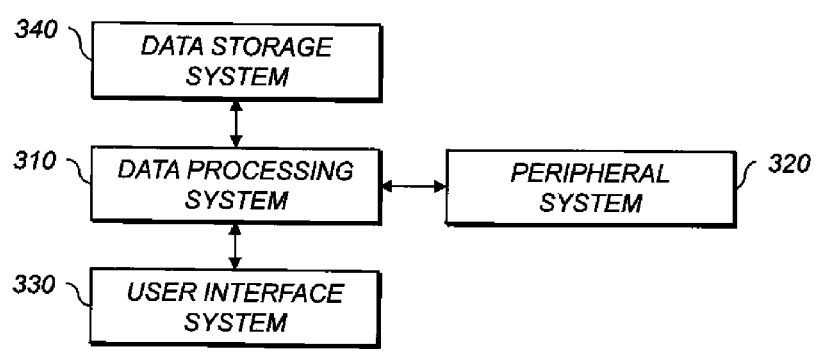
FIG. 3 is a high-level diagram showing the components of a processing system useful with various embodiments.

FIG. 3 is a high-level diagram showing the components of a processing system useful with various embodiments. The system includes a data processing system 310, a peripheral system 320, a user interface system 330, and a data storage system 340. Peripheral system 320, user interface system 330 and data storage system 340 are communicatively connected to data processing system 310.

Data processing system 310 includes one or more data processing devices that implement the processes of various embodiments, including the example processes described herein. The phrases "data processing device" or "data processor" are intended to include any data processing device, such as a central processing unit ("CPU"), a desktop computer, a laptop computer, a mainframe computer, a personal digital assistant, a Blackberry™, a digital camera, cellular phone, or any other device for processing data, managing data, or handling data, whether implemented with electrical, magnetic, optical, biological components, or otherwise.

Data storage system 340 includes one or more processor-accessible memories configured to store information, including the information needed to execute the processes of various embodiments. Data storage system 340 can be a distributed processor-accessible memory system including multiple processor-accessible memories communicatively connected to data processing system 310 via a plurality of computers or devices. Data storage system 340 can also include one or more processor-accessible memories located within a single data processor or device. A "processor-accessible memory" is any processor-accessible data storage device, whether volatile or nonvolatile, electronic, magnetic, optical, or otherwise, including but not limited to, registers, floppy disks, hard disks, Compact Discs, DVDs, flash memories, ROMs, and RAMs.

The phrase "communicatively connected" refers to any type of connection, wired or wireless, between devices, data processors, or programs in which data can be communicated. This phrase includes connections between devices or programs within a single data processor, between devices or programs located in different data processors, and between devices not located in data processors at all. Therefore, peripheral system 320, user interface system 330, and data storage system 340 can be included or stored completely or partially within data processing system 310.

Peripheral system 320 can include one or more devices configured to provide digital content records to data processing system 310, e.g., digital still cameras, digital video cameras, cellular phones, or other data processors. Data processing system 310, upon receipt of digital content records from a device in peripheral system 320, can store such digital content records in data storage system 340. Peripheral system 320 can also include a printer interface for causing a printer to produce output corresponding to digital content records stored in data storage system 340 or produced by data processing system 310.

User interface system 330 can include a mouse, a keyboard, another computer, or any device or combination of devices from which data is input to data processing system 310. Peripheral system 320 can be included as part of user interface system 330. User interface system 330 also can include a display device, a processor-accessible memory, or any device or combination of devices to which data is output by data processing system 310. If user interface system 330 includes a processor-accessible memory, such memory can be part of data storage system 340 even though user interface system 330 and data storage system 340 are shown separately in FIG. 1.

Figure 4:
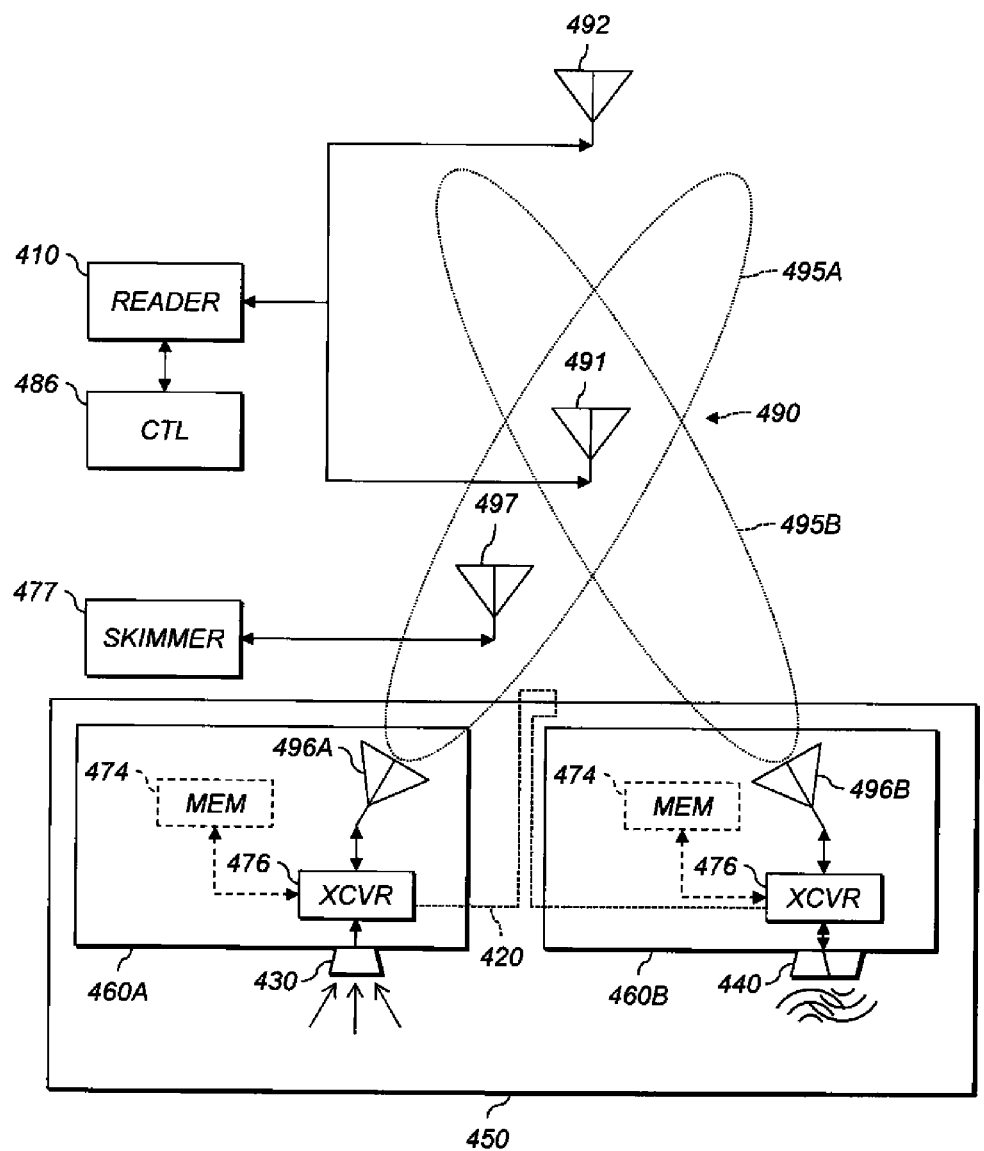
FIG. 4 shows radio-frequency identification (RFID) apparatus according to various embodiments.

FIG. 4 shows radio-frequency identification (RFID) apparatus according to various embodiments.

Object 450 is a non-RFID-active object: object 450 does not respond to queries from RFID reader 410. Object 450 can be a container or shipping crate. Object 450 can block or attenuate RF energy, or not. Two RFID tags 460A, 460B are affixed to object 450 at respective, different tag locations. Tags 460A, 460B can each be active (self-powered in whole or in part) or passive (scavenging power from the RF signal from reader 410). Either tag 460A or 460B can include a memory. Each tag 460A, 460B includes respective directional antenna 496A, 496B. Antennas 496A, 496B can be mechanically separated from other components of tag 460A, 460B, and connected thereto through a feedline.

Antennas 496A, 496B can be implemented using various directional-antenna technologies. They can be phased-array antennas or not. They can be steered electrically, e.g., by adjusting the time of transmission from each element of a phased-array antenna. They can also be steered mechanically, e.g., by rotating a Yagi or other directional antenna on a mount. Each antenna 496A, 496B transmits in a respective, different direction to define respective directional propagation patterns 495A, 495B. Elliptical propagation patterns 495A, 495B are shown for clarity in the drawing; physical propagation patterns 495A, 495B can be more complexly shaped.

Reader location 490 is defined in the intersection of propagation patterns 495A, 495B. Reader location 490 can be a point, line, area, volume, or other shape. The term "intersection" refers to the volume of space in which RF signals can be transmitted to, and received from, tag antennas 496A, 496B with signal-to-noise ratios (SNR) exceeding a selected threshold (e.g., 40 dB). Components of reader 410 other than antenna 491 can be located away from reader location 490. Antenna 491 can be located away from reader location 490 as long as a suitable waveguide or other structure is provided to convey RF energy from reader location 490 to reader antenna 491.

RFID reader 410 is connected to reader antenna 491 located at the reader location i.e., somewhere within the volume of the intersection. Reader 410 communicates with tags 460A, 460B on behalf of controller 486. Controller 486 can be or include a microprocessor, microcontroller, FPGA, PAL, PLA, PLD, ASIC, or other logic or processing device. In various embodiments, reader 410 is also connected to reader antenna 492, which is not located at reader location 490, as will be discussed below with reference to FIG. 5. In various embodiments, reader antenna 492 has a substantially omni-directional propagation pattern, or has a substantially omni-directional propagation pattern in a plane including tag antennas 496A, 496B. For example, reader antenna 492 can be a straight whip antenna or dipole antenna. In these antenna types, radiation is not concentrated by the design of the antenna into a single main lobe.

Skimmer 477 is an unauthorized reader, using skimmer antenna 497 to attempt to communicate with tags 460A, 460B. In this example, skimmer antenna 497 is in propagation pattern 495A, but not propagation pattern 495B. Therefore, skimmer 477 cannot communicate with tag 460B.

Even if skimmer 477 uses a very high power to attempt to communicate with tag 460B, the responses of tag 460B will be attenuated by the directionality of antenna 496B, reducing the SNR present at tag 460A or received at skimmer 477. In various embodiments, tag antennas 496A, 496B have propagation patterns 495A, 495B with a main lobe oriented in a particular direction, and one or more side lobes with power levels −20 dB or lower with respect to the main lobe. In an example, the tag antenna can have a 3 dB beamwidth of approximately 0.5° and a first side lobe level of approximately −22 dB. Further examples of directional antennas that can be used with various embodiments are given in U.S. Pat. No. 7,501,982 to Charash et al., U.S. Pat. No. 6,167,286 to Ward et al., and U.S. Pat. No. 6,337,628 to Campana, all of which are incorporated herein by reference.

In various embodiments, RFID tags 460A, 460B are passive tags. Therefore, skimmer 477 must broadcast high enough power to activate the tag notwithstanding the attenuation of antenna 496B at its angle to skimmer antenna 497. Skimmer 477 must also have high enough receive sensitivity to hear the backscattered response from the tag through the attenuation of antenna 496B and the noise present, including the noise produced by skimmer 477 itself while transmitting. This advantageously significantly reduces the likelihood that skimmer 477 will be able to communicate with tag 460B.

Tags 460A, 460B include respective transceivers 476 that communicate with reader 410 via antennas 496A, 496B. Each tag 460A, 460B can include memory 474, which can be volatile or non-volatile, and can include RAM, ROM, PROM, EPROM, EEPROM, Flash memory, spin-change memory, MRAM, FRAM, flip-flops, or any other memory technology.

In various embodiments, object 450 is a container. In an example, a plurality of intermodal containers (e.g., 53' shipping containers) can have respective RFID tags 460A, 460B. Tags 460A, 460B can be mounted the same distance apart on any container (object 450), but with different orientations of tag antennas 496A, 496B. Consequently, different containers will have differently-oriented propagation patterns 495A, 495B, and thus different reader locations 490. The position of reader location 490 can encode information about what type or size of container object 450 is, i.e., about the classification of container object 450. For example, different reader locations can correspond to different lengths of container, or one reader location can correspond to normal-height and another to high-cube. In various embodiments, antennas 496A, 496B are oriented to project at an angle of 45° from the normal to the container at the respective tag. As a result, propagation patterns 495A, 495B are substantially at right angles at reader location 490. This provides a well-localized reader location 490.

In various embodiments, object 450 is a container. A selected tag (e.g., tag 460A) includes light sensor 430 disposed in or facing the interior of object 450. Tag 460A monitors a light level in the container using light sensor 430. When the light level in the container (object 450) increases by 100% in less than five seconds, tag 460A records a door-open event in memory 474.

In various embodiments, object 450 is a container including a door (not shown). RFID tags 460A, 460B are electrically connected across the door opening using electrical conductor 420. Conductor 420 thus breaks when the door is opened. Either tag 460A, 460B can store in memory an indication of whether conductor 420 is broken. Alternatively, when queried by reader 410, either tag can detect the continuity of conductor 420 and report to reader 410 appropriately. In various embodiments, conductor 420 is further wrapped around at least two sides of the container (object 450). In other embodiments, conductor 420 is a loop connected to two separate connection points on a single tag (e.g., tag 460A or 460B). Tag 460A (respectively 460B) can measure conductor 420 by time-domain reflectometry (TDR) to determine if a break is closer than a selected distance to the other RFID tag 460B (resp. 460A). Tags 460A or 460B can also apply selected test currents to conductor 420, and each tag can detect current from the other as an indication of continuity.

In various embodiments, object 450 is a container. A selected one of the RFID tags, here tag 460B, includes memory 474. Tag 460B includes or is connected to ultrasonic transducer 440, which it uses to monitor the contents of the container (object 450). When the sonic time-of-flight in the container changes by 50%, tag 460B records a contents-changed event in memory 474.

Figure 5:
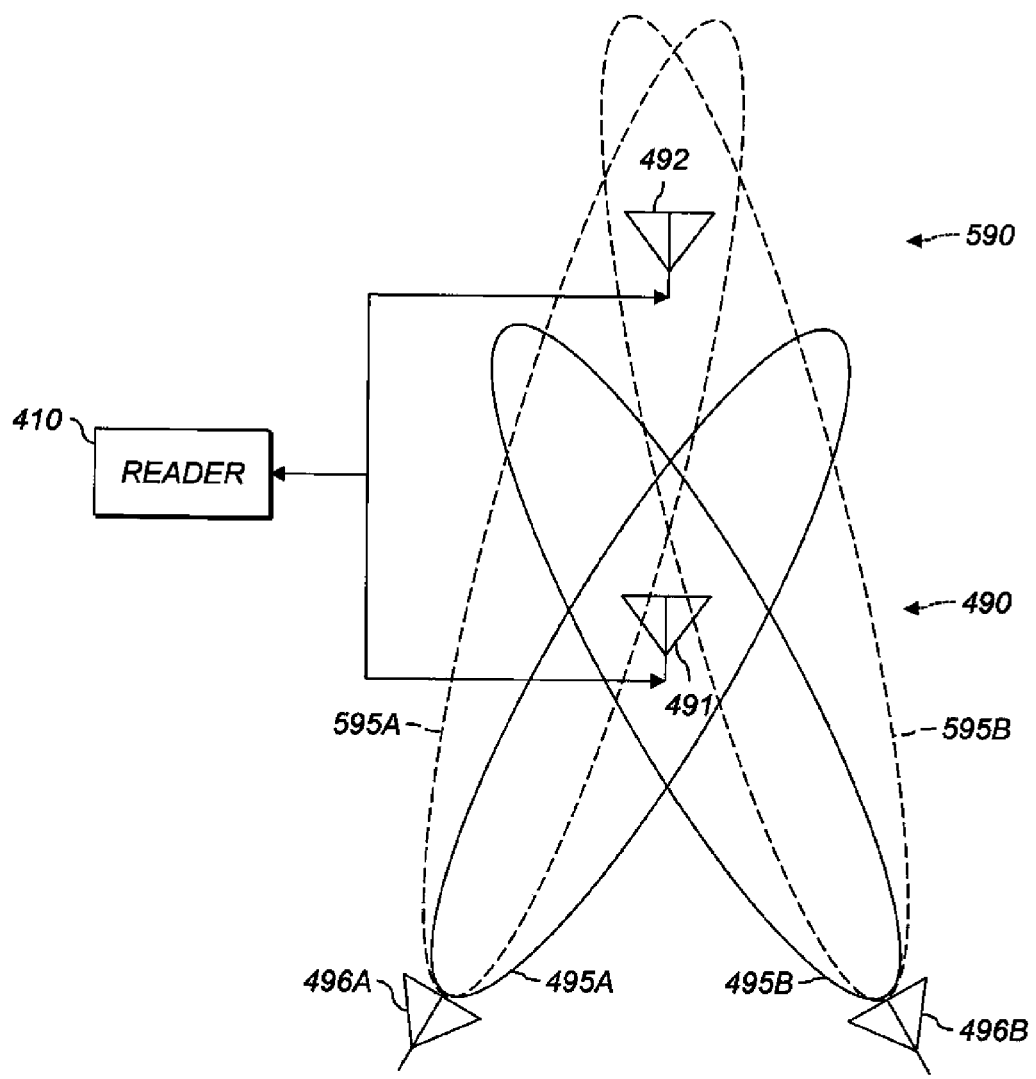
FIG. 5 shows antenna configurations according to various embodiments.

FIG. 5 shows antenna configurations according to various embodiments. Reader 410, reader antenna 491, tag antennas 496A, 496B, propagation patterns 495A, 495B, and reader location 490 are as shown in FIG. 4. Reader is also connected to antenna 492 at second reader location 590 different from location 490. Reader location 590 is at the intersection of propagation pattern 595A, from antenna 496A, and propagation pattern 595B, from antenna 496B. As will be discussed below, reader antenna 491 can be moved between reader locations 490, 590, or two reader antennas 491, 492 can be used to determine which propagation pattern set (495A, 495B or 595A, 595B) is in use by antennas 496A, 496B.

Figure 6A:
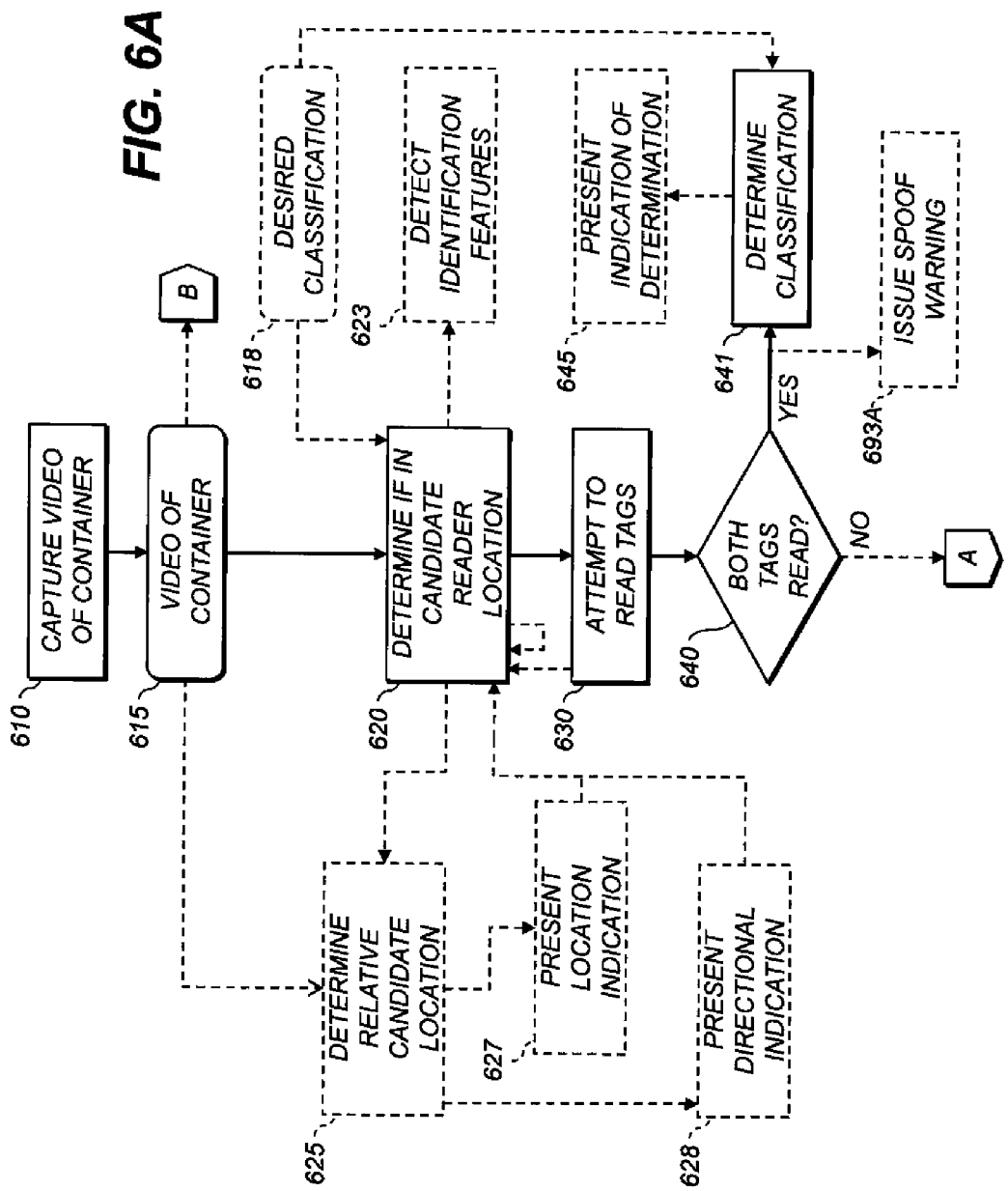
Figure 6:
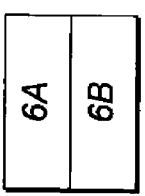

FIG. 6 shows various embodiments of methods of identifying a classification of a container using a mobile station. "Classification" can be correlated with dimensions, volume, or cube (high or normal) of the container, as discussed above. The classification can also indicate whether the container has passed an acceptance test, or is otherwise in a good or bad state. The mobile station can be, e.g., a cellular telephone, smartphone, personal digital assistant (PDA), or digital camera. The mobile station includes a controller, an image capture device (e.g., a CCD or CMOS image sensor and lens), which can be a video capture device, and an RFID reader having a reader antenna. The mobile station can include multiple mechanically separate components, e.g., an RFID reader and a camera, connected by cables or wireless links. For example, the RFID reader can clip to a user's belt and connect via BLUETOOTH to a cellular telephone including a camera and a display. The mobile station can optionally include a display. The display can include an OLED, LCD, or other 2-D or 3-D raster image display unit, or can include one or more LEDs or LCD pixels (including shaped pixels) that convey information. Processing begins with step 610 in FIG. 6A.

Referring to FIG. 6A, in step 610, the image capture device captures one or more image(s), e.g., successive frames of video 615, of the container. Captured image data corresponding to the captured image(s) is provided. In embodiments in which the image capture device is a video capture device, the one or more image(s) can be successive frames of video. The description herein primarily relates to video, but still images can also be used. The image capture device can capture a 2-D, 3-D, or stereo-pair image.

The container has two RFID tags affixed thereto at respective, different tag locations, each tag including a respective directional antenna steered in a respective, different direction, so that respective directional propagation patterns are defined and a reader location is defined in the intersection of the propagation patterns. An example of tags, reader location, and propagation patterns is shown in FIG. 4, discussed above. Step 610 produces video 615 of the container. Video 615 is provided to step 620 and optional step 625. In various embodiments, video 615 is provided to step 660 (FIG. 6B), as discussed below.

In step 620, the controller automatically determines, using the captured image data, whether the mobile station is in a candidate reader location. The controller can use shape-recognition algorithms known in the art to extract a shape of the container from the video. The shape can be compared to shapes stored in a database to determine a number of possible container types. The container types can be ranked according to similarity. Specific shape features of the container, such as the corrugation on the sides or the number or shape of door latches, can be used to rank the types. The highest-ranked type can be selected and a corresponding candidate reader location chosen. Any image metadata present can also be used. Step 620 can be performed repeatedly while the mobile station is not in the candidate reader location, as indicated graphically by the dashed loop arrow on step 620. In various embodiments, when the station is in the candidate reader location, step 620 is followed by step 630. In other embodiments, step 630 is performed even if the controller determines in step 620 that the mobile station is not in the candidate reader location. Step 620 can include optional steps 623 and 625.

In optional step 623, one or more identification features, e.g., barcodes or fiducials, are detected in the captured image data. Conventional image-processing techniques can be used to identify the features in video 615, e.g., segmentation, filtering, and thresholding. At least one of the detected identification features can be a barcode, 1D or 2D (e.g., a UPC or QR code). Fiducials can include crosses, lines, squares, checkerboards, bulls-eyes, and other readily detectable patterns. Identification features can be visible to the human eye or not, as long as they are visible to the camera of the mobile station. Colors of the container or portions of the container can also be detected. Graffiti can be detected and removed from image content of the bulk of the container using a low-pass spatial filter. Diamond signs and other warning signs indicating hazardous contents can also be detected. Text on the container can be detected using optical character recognition. Any detected identification features can be used to rank the candidate types, or to select from the database candidate types having those features. In an example, the candidate reader location is determined to be a selected distance farther from the container than normal if a hazardous-material identification feature is detected on the container.

In optional step 625, the captured image data in video 615 are used to determine the position of the candidate reader location with respect to the mobile station. The determined position is an estimate with tolerances depending on the quality of video 615 and the angles and distances involved. The controller determines where in space the container is with respect to the mobile station, and where the candidate reader location is with respect to the container. The controller then combines the two to determine where the candidate reader location is with respect to the mobile station. In an example, the candidate reader location is halfway along the long side of a 53' intermodal container. The mobile station is facing the long side, at the left-hand end. The controller determines the position is (26.5', 0, 0) with respect to the mobile station. That is, the mobile station has to move to the right about 26.5' to reach the candidate reader location. Step 625 can be followed by optional steps 627 or 628.

In optional step 627, a representation of the determined location is presented on the display. Continuing the above example, an image of the whole container can be presented on the display. An icon can be overlaid on the image indicating the current position of the mobile station with respect to the container. Another icon can be overlaid on the image indicating the position of the candidate reader location.

In optional step 628, an indication of a direction in which to move the mobile station to approach the candidate reader location is presented on the display. A user holding the mobile station can move in the indicated direction to approach the candidate reader location. Continuing the above example, the text "move right 26.5'" can be displayed on the display. A right arrow can also be displayed, optionally with an indication of distance.

In various embodiments, the mobile station includes a database of reference images. Reference images include metadata describing the shape of the reference in the image, and the position of the reader location with respect to the depicted reference or the camera position at the time of capture of the reference image. Metadata can also include machine-readable versions of any text in the stored image of the reference. The image data for the reference images can be stored or not. A frame of data in video 615 is compared to the stored reference images by extracting metadata from the frame describing the shape of the reference in the frame of video data. Shape metadata can be extracted by, e.g., high-pass filtering and thresholding the image to detect edges, then combining adjacent edges to form a shape model. Other ways of extracting shapes are described, e.g., in U.S. Pat. No. 8,155,382 to Rubenstein, U.S. Pat. No. 4,803,735 to Nishita et al., U.S. Pat. No. 5,119,445 to Suzuki et al. The determined shape metadata is compared to the metadata of at least some of the reference images. In various embodiments, the metadata are described by a string stored in a database. A string comparison is performed to find the images with strings having the smallest Hamming distance (or another distance metric) from the string describing the shape metadata. The single image with the most closely-matching metadata can be selected, or a plurality of close matches can be selected and displayed to the user, who then chooses one of the matches to use. Metadata can be represented using data structures other than strings.

Different reference images can depict the same container and reader location, but viewed from different angles, to provide better accuracy in shape matching. In various embodiments, captured image data is compared to each reference image, and each container type has multiple reference images. The container type for which the most reference images are ranked highly as matches is selected. For example, if different images of a given container type are six out of the ten top-ranked possible matches, the given container type is selected and the corresponding candidate reader location determined.

Different reference images can be of a container with an identification feature, so the orientation of the identification feature can be correlated to the orientation of the container. Different reference images can be of different faces of the container, and a 3-D model of the connections between the faces can be provided, so that a view of the container from any angle can be synthesized from the face images and the model, and the view can be compared to the captured video image data to identify the container.

Different reference images can also depict containers of the same shape but different classifications. In an example, a given shape of container can have different classifications depending on what type of internal shielding it includes. Two containers of the same shape when viewed from the outside can differ in that one can include lead shielding so that it can transport materials that emit alpha particles, and another can include aluminum shielding so that it can transport materials that emit beta particles. The classification (alpha-carrying or beta-carrying) can be indicated by respective reader locations arranged at the same distance from the side of the container, spaced apart in the direction parallel to the side of the container. The controller can present display indications directing a user to walk parallel to the side of the container at the distance, and the reader location at which both tags are readable indicates the classification.

Figure 8A:
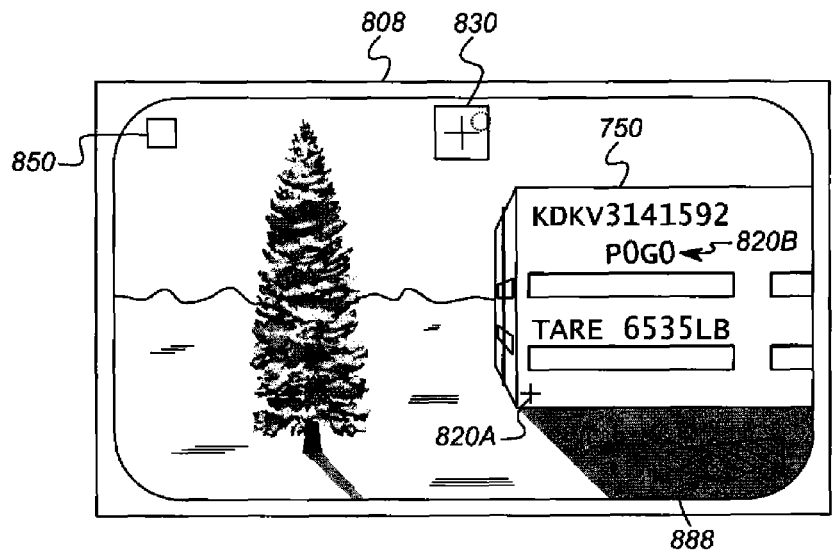
FIGS. 8A and 8B show examples of frames of video data captured by a video capture device 720 in respective, different positions.

In various embodiments, if the controller determines that very few reference images match the video image data, or the reference images that match are all ranked relatively low, the controller adjusts the image and searches for a match to the adjusted image. Adjustments can include rotating or flipping so that the longest straight segment detected in the image is oriented along a horizontal, vertical, or selected diagonal line. Adjustments can also include detecting parallelograms in the image, such as those provided by a perspective of the end of a container (e.g., as shown in FIG. 8A, the outline of the door of the container), and rotating or moving the image so the parallelogram is oriented with respect to a reference viewpoint. Adjustments can also include skewing the image, adjusting contrast, brightness, or color-balance, sharpening, or blurring.

In various embodiments, the reference images are stored in an obfuscated form, and the controller receives an indication, e.g., from a user of the mobile station, of a sequence of image transformations. The controller applies the image transformations to the captured video data, and then compares the transformed image to the reference images in the database. The obfuscation is one-way so that the images cannot readily be transformed back into sharp images. A malicious individual wanting to produce a container with a particular reader location would have to mark or shape the container appropriately so that the controller would detect the container as having a candidate reader location at the particular reader location. Obfuscating the images in the database reduces the probability that the malicious individual will be able to determine the appropriate marks or shapes from the database.

In various embodiments, the captured frames of video 615 are stored, and each is associated with a relative position determined from an accelerometer or GPS receiver in the mobile station. Relative position can also be determined using a sonar or laser-ranging unit. In various embodiments, accelerometer data is used to determine the orientation of the reader antenna, and the controller presents an indication on the display to direct the user to orient the reader antenna a certain way.

In an example, the orientation of the camera is stored with each video frame. In various embodiments, the controller detects the orientation of the camera and, if the camera is pointing down or other than substantially level, issues a warning. This reduces the probability of mis-classifying high-contrast shadows as part of the shape of the container.

In various embodiments, step 620 includes determining a direction from which light illuminating the container originates. The controller can detect light sources directly in the captured video data by thresholding or high-pass spatial filtering. The controller can also detect light sources outside the video data (e.g., the sun) by mapping a brightness gradient over multiple frames as the camera moves, and determining the light source is in the direction where vectors up the gradient intersect. The controller can also filter the image to reduce the occurrence of sharp edges and look for sunbeams or other light beams that intersect at a specific location, and determine a light source is at that location. In various embodiments, the orientation and relative position of the camera (or the mobile station, if the camera is fixed with respect to the mobile station) at capture time are stored with each captured video frame. The orientation and relative position can be determined using an accelerometer or other position- and orientation-measurement device, e.g., a device that can measure in six degrees of freedom (X, Y, Z, $\phi$, $\theta$, $\psi$).

Once the direction of light has been determined, the controller can search the image for light-to-dark transitions along that direction and determine those are the edges of shadows. The controller can then disregard the shadows while searching the image data for the shape of the container. The controller can also perform analyses described in these embodiments for each of multiple light sources.

In step 630, when the mobile station is in the candidate reader location, the controller activates the RFID reader to attempt to read both tags. In various embodiments, the container is an intermodal container and the RFID tags are UHF EPC tags. Step 630 is followed by decision step 640.

In various embodiments, the controller alternates between steps 630 and 640, or performs both simultaneously, to repeatedly attempt to read both tags until the mobile station reaches the candidate reader location. In some of these embodiments, steps 627 or 628 are used during or between steps 630 or 640 to present on the display an indication of a direction in which to move the mobile station to approach the candidate reader location.

Decision step 640 determines whether both tags were read in the candidate reader location. If so, the next step is step 641 or step 693A. If not, in various embodiments, the next step is step 660 (FIG. 6B). In other embodiments, if both tags were not read, the controller determines the container is not of the corresponding classification, and the method ends.

In step 641, in various embodiments, since both tags were read while the mobile station was in the candidate reader location, the controller determines the classification of the container is a classification corresponding to the candidate reader location. The controller can use a lookup table to map candidate reader location to container classification. Step 641 can be followed by optional step 645. In optional step 645, an indication of the determination by the controller is presented on the display. Continuing the above example, the candidate reader location is spaced apart from the container by a selected distance indicating that the classification of container is one holding perishable goods. If both tags are read, the controller determines that the container does hold perishable goods (step 641), and optionally informs the user of the mobile station (step 645). If both tags are not read, the controller does not make that determination. In various embodiments, if the classification is two-valued (e.g., either does or does not contain perishable goods, there being no other possibility than those two), the controller can determine the classification based on not reading both tags in the candidate reader location. In various embodiments, the controller only determines the classification if both tags are read. These embodiments provide additional security against false determinations due to loss of, or damage to, the RFID tags on the container.

In various embodiments, step 640 is followed by step 693A. These embodiments are used with alternating of steps 620 and 630, together with step 627 or step 628. In these embodiments, if both tags were read at a detection location between the candidate reader location and the second candidate reader location, the controller determines that a spoofer is present and is attempting to emulate or spoof RF signals from the tags on the container. This determination is made since signals from the tags should only be detected when at the candidate location (or the second candidate location, in embodiments discussed below using step 693B of FIG. 6B). The controller issues a spoof warning, e.g., by causing the display on the mobile station to present a visual warning message. The controller can also cause the mobile station to beep or otherwise produce an audible warning. The controller can also notify a security controller using a wireless link. In various embodiments, the controller discontinues attempting to communicate with the tags if a spoofer is present. Discontinuing communications reduces the probability of unintentionally revealing some tag data to a skimmer.

In various embodiments, the controller receives desired classification 618. The controller can receive desired classification 618 from a user through keyboard, touchscreen, audio, or other user interface, or from another controller or computer over a network (e.g., 802.11, IrDA, cellular data). Determining step 620 includes using desired classification 618 to determine the candidate reader location. For example, the controller can include a database matching container classifications to candidate reader locations, and can look up the desired classification in the database. Since the candidate reader location is correlated with the desired classification, if both tags are read while the mobile station is in the candidate reader location, the controller determines in step 641 that the classification of the container is desired classification 618.

Referring to FIG. 6B, in step 660, since both tags were not read in the candidate reader location (step 630, FIG. 6A), the controller automatically determines a second candidate reader location. The second candidate reader location can be determined as discussed above with respect to the candidate reader location (step 620, FIG. 6A). Multiple frames of video image data can be compared to the set of reference images, and the reference images that rank most highly compared to a plurality or majority of the video frames can be selected to determine the container type. Data from a temperature or humidity sensor can also be used to determine the second candidate reader location, since those factors affect RF performance. Step 660 is followed by step 670. In various embodiments, video 615 is provided directly to step 660, and the second candidate reader location is the only location tested. In these embodiments, steps 620-640 are not performed.

In step 670, an indication of a direction in which to move the mobile station to approach the second candidate reader location is presented on the display. This can be done, e.g., as discussed above with respect to steps 625, 628 (FIG. 6A). Step 670 is followed by step 680.

In step 680, the controller attempts to read both tags. This is as discussed above with respect to step 630 (FIG. 6A). Step 680 is followed by decision step 682.

Decision step 682 decides whether both tags have been read. This is as discussed above with respect to step 640 (FIG. 6A). If so, the next step is step 692 or step 693B. If not, the next step is decision step 684.

In step 692, in various embodiments, if both tags were read at a detection location between the candidate reader location and the second candidate reader location, the controller determining the classification of the container is a classification corresponding to the detection location. The detection location, or the spatial relationship of the detection location to the candidate reader location or the second candidate reader location, encodes analog information about the classification. For example, the reader location can move over time to indicate the time since the container was put in service, or loaded, or sealed, or the battery life remaining in active tags.

In other embodiments, if both tags were read at a location other than the second candidate location, step 682 is followed by step 693B. In these embodiments, analog information about the classification is not encoded in the tags' radiation patterns. In step 693B, the controller determines that a spoofer is present and issues a warning, as discussed above with reference to step 693A.

Decision step 684 decides whether the mobile station has reached the second candidate reader location, within tolerances. The tolerances can be determined based on the RF properties of reader 410 and reader antenna 491 (FIG. 5), and on the configurations of propagation patterns 495A, 495B (FIG. 5). If the mobile station has reached the second candidate reader location, the next step is decision step 686. If not, the next step is step 680. In this way, the controller repeatedly attempts to read both tags until either both tags have been read successfully, or the mobile station has reached the second candidate location.

In various embodiments, the repeating of read attempts can be discontinued by a user input or a timeout. The time between successive read attempts (step 680) can be selected based on data in video 615 (FIG. 6A), e.g., relative container size or proximity; on battery life of the mobile station; or on user preferences.

Decision step 686 decides whether both tags were read at the second candidate location. Decision step 686 can include one or more additional attempts to read both tags while the mobile station is at the second candidate location. If both tags were not read at any point between the candidate reader location and the second candidate reader location, and both tags are read while the mobile station is in the second candidate reader location, the controller determines the classification of the container is a classification corresponding to the second candidate reader location (step 696).

Either of steps 682 and 684 can be performed before the other. Steps can be performed in an order that differentiates tag reads before reaching the second candidate location from tag reads at the second candidate location. Motion of the mobile station can be detected, e.g., using GPS or an accelerometer, and detected motion data used in addition to, or instead of, data from video 615 to determine when the mobile station has reached the candidate or second candidate reader location.

In various embodiments, in steps 630 or 680, the controller stores information about whether both tags were read, and where the mobile station was with respect to the candidate reader location, or reader location. This information is then used in the future in steps 620, 625, or 660 to determine a candidate reader location. For example, in a shipping yard with many containers of a certain classification "A," if classifications "A" and "B" in the database are very similar, the controller can determine that classification "A" is more likely in this particular yard and prefer "A" over "B" when suggesting a candidate reader location.

In various embodiments, if the detected shape of the container in the video image data is too small, a message is displayed on the screen that the mobile station needs to be moved closer. The threshold of what is too small can be determined by the controller by comparing the success rate at determining the correct reader location as the first candidate reader location with the size initially detected. If the success rate is below a desired value, the controller can set the threshold so that the container shape has to be larger before performing step 625.

Figure 7:
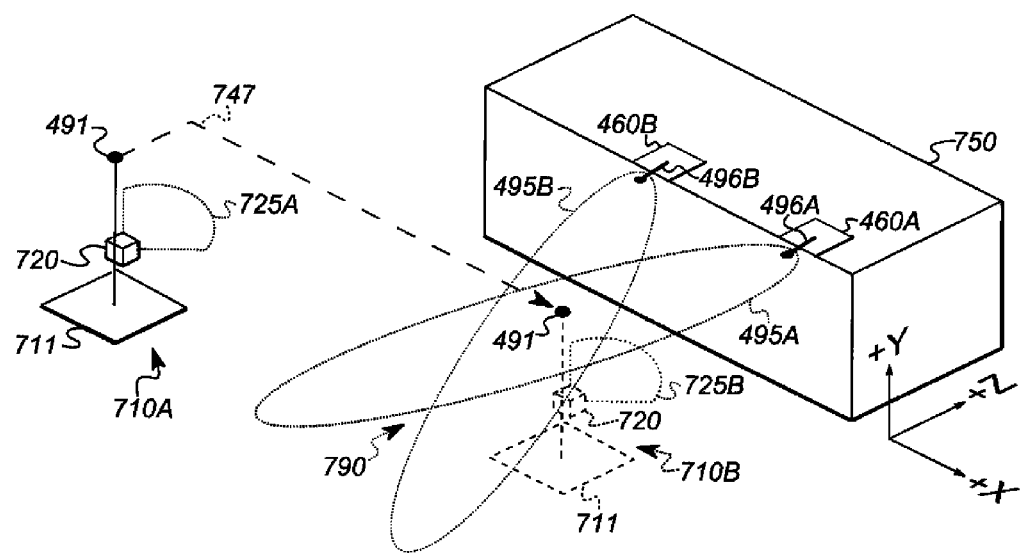
FIG. 7 shows an isometric view of a container and a mobile station according to various embodiments.

FIG. 7 shows an isometric view of container 750 and mobile station 711 according to various embodiments. Container 750 has affixed thereto RFID tags 460A, 460B. Each tag has a respective tag antenna 496A, 496B. Each antenna transmits or receives RF energy in a respective propagation pattern 495A, 495B. This is as discussed above with reference to FIG. 4.

Mobile station 711 is shown in two positions. Position 710A shows mobile station 711 outside candidate reader location 790. Position 710B shows mobile station 711 after moving to candidate reader location 790 along path 747 (or another path with the same endpoints). Mobile station 711 includes reader 410 (FIG. 4) and video capture device 720. Fields of view 725A, 725B represent the volumes of space visible to video capture device 720 at positions 710A and 710B, respectively. Candidate reader location 790 is a location at which the controller has determined both RFID tags 460A, 460B are readable if container 750 is of a selected classification. At candidate reader location 790, the controller attempts to read both tags 460A, 460B to determine whether the classification is the selected classification.

From position 710A, mobile station 711 has to move closer to container 750 (along the Z axis), and to the right (along the X axis) to reach position 710B. In position 710B, reader antenna 491 is in candidate reader location 790, and can attempt to read signals from tags 460A, 460B.

Figure 8B:
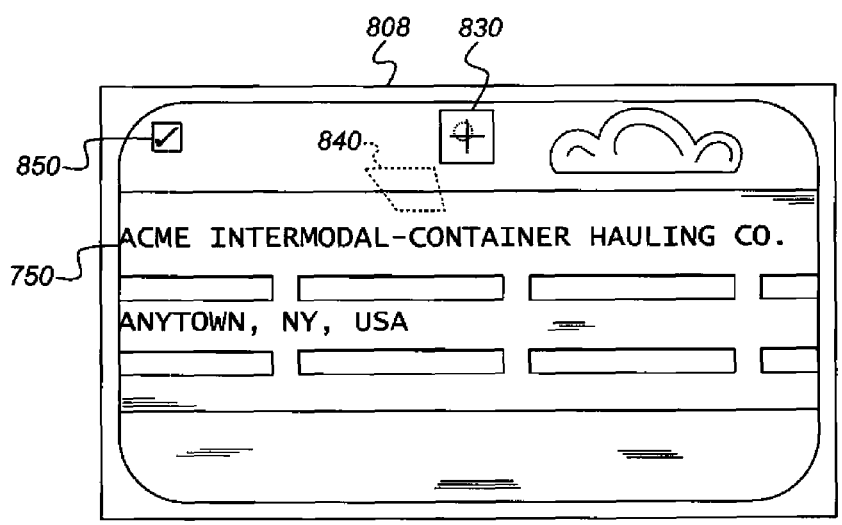

FIGS. 8A, 8B show examples of frames of video data captured by video capture device 720 (FIG. 7) in positions 710A, 710B, respectively. Both FIGS. 8A and 8B show display 808 on mobile station 711 (FIG. 7).

In various embodiments, various indications are presented on the display, either selectively or continuously. In various embodiments, determination indication 850 is presented. When mobile station 711 reaches candidate reader location 790 (FIG. 7) and reads both RFID tags 460A, 460B, the controller determines the classification of the container is a classification corresponding to the candidate reader location. The controller then causes the display to indicate a check or other affirmative symbol or text in determination indication 850. In some embodiments, the controller causes a negative indication (e.g., an "X") to be displayed at candidate reader location 790 if both tags are not read.

In various embodiments, targeting indication 830 is displayed to indicate to the user of mobile station 711 the position of candidate reader location 790 with respect to mobile station 711, or vice-versa. Continuing the example of FIG. 7, FIG. 8A shows that the user should convey mobile station 711 ahead and to the right to position the plus-shaped station marker in the target-shaped reader-location marker. The user of the mobile station follows the circle to reach candidate reader location 790. FIG. 8B shows that mobile station 711 is in candidate reader location 790, but slightly to the right and behind the center of candidate reader location 790.

In various embodiments, direction indication 888 is presented on the display. Direction indication 888 shows a direction in which to move the mobile station to approach candidate reader location 790. FIG. 8A shows direction indication 888 pointing the user to move mobile station 711 ahead and to the right.

In various embodiments, a wireframe (not shown) is displayed to indicate to the user the correct orientation of the container with respect to the camera when the mobile station is in the candidate reader location.

In FIG. 8A, the left-hand (−X) end of container 750 is visible. In various embodiments, container 750 is marked with an identification feature, e.g., features 820A or 820B. In the examples shown here, identification feature 820A is a fiducial having a known size and position with respect to the edges of container 750. The controller can use this fiducial to determine the distance to container 750 by comparing measured size in pixels to known size in physical units (e.g., mm or in). The controller can also use this fiducial to determine the orientation of container 750 by comparing the measured distances between the fiducial and the edges of container 750 with the known physical distances.

Identification feature 820B ("P0G0") is an ISO 6346 size code. The controller can read this code using optical character recognition (OCR). "P0" indicates the container is 53' long (P), 8' high by 8' wide (0). "G0" means container 750 is a general-purpose container with no ventilation, and it opens at one or both ends. The controller can use the size and classification information to determine candidate reader location 790, e.g., using a lookup table.

In FIG. 8B, mobile station 711 is in candidate reader location 790, facing the side of container 750. In various embodiments, reader location indication 840 shows the location of the center of candidate reader location 790. In an example, indication 840 is a rectangular indication similar to indications used in digital still cameras to indicate the area of the image being brought into focus by an autofocus mechanism.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. The word "or" is used in this disclosure in a non-exclusive sense, unless otherwise explicitly noted.

The invention has been described in detail with particular reference to certain preferred embodiments thereof, but it will be understood that variations, combinations, and modifications can be effected by a person of ordinary skill in the art within the spirit and scope of the invention.

PARTS LIST 10 base station
12 air interface
14 reader
16 reader's antenna
18 memory unit
20 logic unit
22, 24, 26 RFID tag
30, 44, 48 antenna
42 RF station
52 range
54 antenna
56 power converter
58 demodulator
60 modulator
62 clock/data recovery circuit
64 control unit
80 output logic
310 data processing system
320 peripheral system
330 user interface system
340 data storage system
410 RFID reader
420 conductor
430 light sensor
440 ultrasonic transducer
450 object
460A, 460B RFID tag
474 memory
476 transceiver
477 skimmer
486 controller
490 reader location
491, 492 reader antenna
495A, 495B propagation pattern
496A, 496B tag antenna
497 skimmer antenna
590 reader location
595A, 595B propagation pattern
610 capture video of container step
615 video of container
618 desired classification
620 determine if in candidate reader location step
623 detect identification features step
625 determine relative candidate location step
627 present location indication step
628 present directional indication step
630 attempt to read tags step
640 both tags read? decision step
641 determine classification step
645 present indication of determination step 660 determine second candidate reader location step
670 present directional indication step
680 attempt to read tags step
682 both tags read? decision step
684 second candidate location reached? decision step
686 both tags read? decision step
692 determine classification step
693A, 693B issue spoof warning step
696 determine classification step
710A, 710B mobile station position
711 mobile station
720 video capture device
725A, 725B field of view
747 path
750 container
790 candidate reader location
808 display
820A, 820B identification feature
830 targeting indication
840 reader location indication
888 direction indication
850 determination indication
X, Y, Z axis

The invention claimed is:

1. Method of identifying a classification of a container using a mobile station including a controller, an image capture device, and an RFID reader having a reader antenna, the method comprising:
   using the image capture device, capturing one or more image(s) of the container to provide captured image data, wherein the container has two RFID tags affixed thereto at respective, different tag locations, each tag including a respective directional antenna steered in a respective, different direction, so that respective directional propagation patterns are defined and a reader location is defined in an intersection of the propagation patterns;
   the controller automatically determining, using the captured image data, whether the mobile station is in a candidate reader location; and
   when the mobile station is in the candidate reader location, the controller activating the RFID reader to attempt to read both tags, so that if both tags are read while the mobile station is in the candidate reader location, the controller determines the classification of the container is a classification corresponding to the candidate reader location;
   disposing each container within the space at a respective container position;
so that the propagation patterns of the tags for each container intersect to define a respective per-container reader location with respect to the respective container position, and the tag locations, antenna directions, and container positions are selected so that the respective per-container reader locations for each container disposed in the space at least partially overlap to define a reader location.

2. The method according to claim 1, wherein the mobile station further includes a display and the method further includes:
   using the captured image data to determine a position of the candidate reader location with respect to the mobile station; and
   presenting on the display a representation of the determined position.

3. The method according to claim 2, wherein the presenting step includes presenting on the display an indication of a direction in which to move the mobile station to approach the candidate reader location.

4. The method according to claim 1, wherein the candidate-reader-location-position-determining step includes comparing the captured image data to a plurality of reference images and selecting a candidate reader location corresponding to the reference image that most closely matches the captured image data.

5. The method according to claim 4, wherein the candidate-reader-location-position-determining step further includes, if no reference image matches the captured image data within a certain threshold, adjusting the captured image data and comparing the adjusted image data to the plurality of reference images, wherein the adjustment is selected from the group consisting of rotating, flipping, orienting the image so parallelograms therein are oriented with respect to a reference viewpoint, skewing, adjusting contrast, adjusting brightness, adjusting color balance, sharpening, and blurring.

6. The method according to claim 4, wherein the reference images are obfuscated and the candidate-reader-location-position-determining step includes receiving an indication of a sequence of image transformations and applying the indicated transformations to the captured image data before comparing it to the obfuscated reference images.

7. The method according to claim 4, wherein the capturing step includes capturing a position or an orientation of the camera with the image data and the candidate-reader-location-position-determining step includes using the captured position or orientation data for one or more of the captured image(s) together with the captured image data to determine a direction from which light illuminating the container originates, using the direction to locate shadows in the captured image data and removing them to provide adjusted image data, and comparing the adjusted image data to the reference images.

8. The method according to claim 1, further including presenting on the display an indication of the determination by the controller.

9. The method according to claim 1, wherein the container is an intermodal container and the RFID tags are UHF EPC tags.

10. The method according to claim 1, wherein the determining step includes detecting one or more identification features in the captured image data.

11. The method according to claim 10, wherein at least one of the detected identification features is a barcode.

12. The method according to claim 1, further including, when both tags are not read in the candidate reader location:
   the controller automatically determining a second candidate reader location;
   presenting on the display an indication of a direction in which to move the mobile station to approach the second candidate reader location;
   repeatedly attempting to read both tags until the mobile station reaches the second candidate reader location; and
   if both tags were read at a detection location between the candidate reader location and the second candidate reader location, the controller determining the classification of the container is a classification corresponding to the detection location.

13. The method according to claim 12, further including, if both tags were not read between the candidate reader location and the second candidate reader location, and both tags are read while the mobile station is in the second candidate reader location, the controller determining the classification of the container is a classification corresponding to the second candidate reader location.

14. The method according to claim 1, wherein the mobile station further includes a display and the method further includes:
   presenting on the display an indication of a direction in which to move the mobile station to approach the candidate reader location;
   repeatedly attempting to read both tags until the mobile station reaches the candidate reader location; and
   if both tags were read at a detection location between the candidate reader location and the second candidate reader location, the controller issuing a spoof warning.

15. The method according to claim 1, wherein the RFID tags are passive tags.

16. The method according to claim 1, further including the controller receiving a desired classification, wherein the determining step includes using the desired classification to determine the candidate reader location, so that if both tags are read while the mobile station is in the candidate reader location, the controller determines the classification of the container is the desired classification.

17. The method according to claim 1, wherein the image capture device is a video capture device, and the one or more image(s) are successive frames of video.

* * * * *